United States Patent [19]

Garito et al.

[11] 4,016,331

[45] Apr. 5, 1977

[54] COMPOSITE POLYMERIC MATERIAL FORMED WITH AN EPITAXIAL CRYSTALLINE FILM OF POLYMERIC SULFUR NITRIDE, AND METHOD OF PREPARING SAME

[75] Inventors: Anthony Frank Garito, Radnor; Alan J. Heeger, Wynnewood; Alan G. MacDiarmid, Drexel Hill, all of Pa.; Arthur A. Bright, North Olmstead, Ohio; Marshall J. Cohen, Philadelphia; Chester M. Mikulski, Melrose Park, both of Pa.

[73] Assignee: The Trustees of the University of Pennsylvania, Philadelphia, Pa.

[22] Filed: Jan. 26, 1976

[21] Appl. No.: 652,611

[52] U.S. Cl. .............................. 428/421; 427/62; 427/109; 427/248 R; 428/422; 428/480; 428/523; 428/538

[51] Int. Cl.$^2$ ................ B05D 5/12; B32B 27/06; C23C 13/02; C23C 13/04

[58] Field of Search .......... 428/421, 422, 480, 523, 428/538; 427/62, 109, 248

[56] References Cited

OTHER PUBLICATIONS

Bright et al., Appl. Phys. Lett., (26), pp. 612–615, (1965).

Mikulski et al. I, J. Amer. Chem. Soc., 97 (22), pp. 6358–6363, (1975).

Mikulski et al. II, Phys. Rev. Lett., 34 (4), pp. 206–209, (1975).

MacDiarmid et al., J. Chem. Soc., Chem. Comm., pp. 476–477, (1975).

Hsu et al., J. Chem. Phys., 61 (11), pp. 4640–4645, (1974).

Walatka et al., Phys. Rev. Lett., 31 (18), pp. 1139–1142, (1973).

*Primary Examiner*—J.C. Cannon
*Attorney, Agent, or Firm*—Holman & Stern

[57] ABSTRACT

A composite polymeric material having metallic surface properties is prepared by subliming solid crystalline polymeric sulfur nitride to a vapor, and thereafter condensing the polymeric sulfur nitride vapor onto the surface of a highly-oriented thermoplastic polymeric substrate to thereby form on the substrate an epitaxial crystalline polymeric sulfur nitride film. The polymeric sulfur nitride film is completely oriented parallel to the direction of orientation of the substrate and has a relatively high degree of anisotropy with respect to its electrical conductivity and optical properties.

19 Claims, 3 Drawing Figures

COMPOSITE POLYMERIC MATERIAL FORMED WITH AN EPITAXIAL CRYSTALLINE FILM OF POLYMERIC SULFUR NITRIDE, AND METHOD OF PREPARING SAME

BACKGROUND OF THE INVENTION

This invention relates to composite polymeric materials having metallic surface properties, and, more particularly, to composite polymeric materials formed with an epitaxial crystalline film of polymeric sulfur nitride.

The covalent polymeric metal, polymeric sulfur nitride, $(SN)_x$, also known as polythiazyl, is believed to be the first known example of a metallic polymer. In single-crystal form, polymeric sulfur nitride exhibits a highly anisotropic electrical conductivity with a metal-like temperature dependence, as well as optical properties which are similarly anisotropic and suggestive of metallic behavior.

The synthesis, structure and properties of analytically pure single crystals of polymeric sulfur nitride have been described by Mikulski, et al, J. Amer. Chem. Soc., Vol. 97, 22, Oct. 29, 1975, pages 6358–6363. The method of synthesis described by Mikulski, et al, involves first the production of pure $S_2N_2$ from $S_4N_4$ by passing $S_4N_4$ vapor over heated silver wool to form $S_2N_2$ vapor, condensing the $S_2N_2$ on the surface of a cold finger containing liquid nitrogen, and then bringing the liquid nitrogen cold traps to room temperature to permit the $S_2N_2$ to sublime slowly from them into a rectangular trap held at 0° C. The sublimation step assists in separating the $S_2N_2$ from any less volatile impurities and also permits the slow growth of good $S_2N_2$ crystals. When appropriate size $S_2N_2$ crystals have been obtained, they are permitted to polymerize spontaneously in the solid state at room temperature over a period of about 60 hours, followed by heating at 75° C. for about two hours to complete the polymerization. This procedure results in the production of brilliant, highly-lustrous, golden crystals of polymeric sulfur nitride which are pseudomorphs of and have the same space group as the $S_2N_2$ crystals from which they are derived. These polymeric sulfur nitride crystals are composed of an ordered array of parallel polymeric sulfur nitride fibers which consist of an almost planar chain of alternating sulfur and nitrogen atoms. The product is analytically pure, and x-ray diffraction shows the absence of $S_4N_4$ and $S_2N_2$.

The highly anisotropic electrical conductivity and optical properties exhibited by the single-crystal form of polymeric sulfur nitride makes this metallic polymer potentially useful in the form of a film fabricated on a suitable substrate so as to form a composite material having metallic surface properties. Such composite material would have a wide variety of useful applications taking advantage of the combined mechanical, electrical, and optical properties thereof, such as, for example, in integrated optical systems. However, previous attempts along these lines have failed to produce a polymeric sulfur nitride film having the expected high degree of anisotropy with respect to its electrical conductivity and optical properties, apparently due to a random and incomplete alignment of the polymeric sulfur nitride chains in the film. For example, when polymeric sulfur nitride films are fabricated by direct sublimation of the crystalline polymeric sulfur nitride onto a glass substrate, the resulting films, when examined under a microscope, have the same gold appearance as crystalline polymeric sulfur nitride and exhibit a high-quality reflective surface. However, when these films are examined under polarized light, while each grain of the film appears reflective at some angle of the polarizer, confirming that the chain direction of each grain lies in the plane of the film, the optical anisotropy of the film is substantially reduced when compared with single-crystal results. Moreover, these films show no evidence of electrical conductivity anisotropy at any temperature over the range of from close to 0° K. to about room temperature.

BRIEF SUMMARY OF THE INVENTION

It is accordingly a primary object of the present invention to provide a crystalline film of polymeric sulfur nitride wherein the polymeric sulfur nitride chains are substantially completely aligned so that the film exhibits a relatively high degree of anisotropy with respect to its electrical conductivity and optical properties over the entire surface thereof.

Another object of the present invention is to provide a polymeric sulfur nitride film in accordance with the preceding object, wherein the degree of electrical conductivity and optical anisotropy exhibited by the film is similar to that exhibited by the single-crystal form of polymeric sulfur nitride.

A further object of the present invention is to provide a method of fabricating a polymeric sulfur nitride film in accordance with the preceding objects onto a variety of substrates so as to produce composite materials having metallic surface properties.

The above and other objects are achieved in accordance with the present invention by subliming solid crystalline polymeric sulfur nitride to a vapor, and thereafter condensing the polymeric sulfur nitride vapor onto the surface of a highly-oriented thermoplastic polymeric substrate to thereby form on the substrate an epitaxial crystalline polymeric sulfur nitride film. The resulting polymeric sulfur nitride film is completely oriented parallel to the direction of orientation of the substrate and exhibits over its entire surface a relatively high degree of anisotropy with respect to its electrical conductivity and optical properties, very similar to that exhibited by the single-crystal form of polymeric sulfur nitride. The substrate-polymeric sulfur nitride composite polymeric material thereby obtained has metallic surface properties imparted by the epitaxial crystalline polymeric sulfur nitride film, and has utility in a wide variety of applications taking advantage of the particular combination of mechanical, electrical and optical properties thereof, such as, for example, in integrated optical systems.

DESCRIPTION OF THE DRAWINGS

The method and product of the present invention and the advantages thereof will be further understood and appreciated from the following detailed description of a preferred embodiment of the invention which is illustrated in the accompanying drawings, in which.

DESCRIPTION OF A PREFERRED EMBODIMENT

Figure 1:
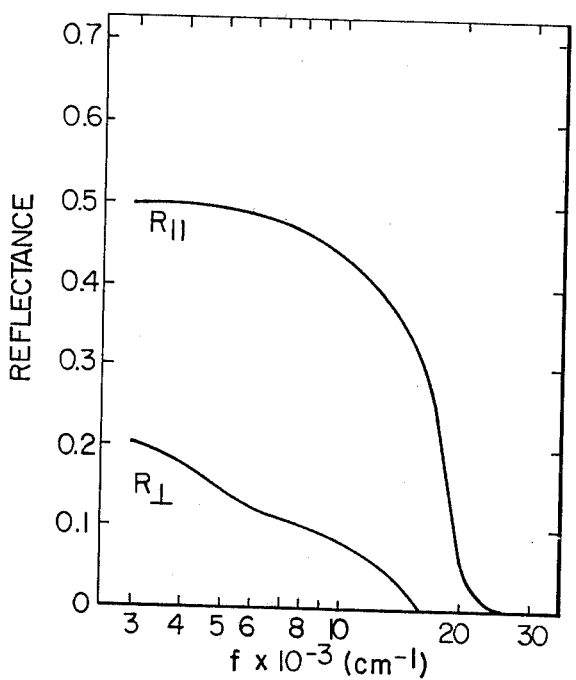
FIG. 1 is a graphical illustration of the polarized reflectance spectra of an oriented epitaxial crystalline polymeric sulfur nitride film prepared in accordance with the present invention.

The method of the present invention employs as a substrate a highly-oriented thermoplastic polymeric material, preferably in the form of thin sheet or film. Particularly suitable thermoplastic polymeric materials include polyolefins, such as, polyethylene, and polypropylene; fluorocarbon polymers, such as, polytetrafluoroethylene (e.g., Teflon) and polyvinylidene fluoride (Kynar); and polyesters, such as, polyethylene terephthalate (e.g., Mylar). Other thermoplastic polymeric materials which can be used as a substrate in accordance with the present invention include polyamides, polyacetals, polystryene, styrene interpolymers, such as, acrylonitrile-butadiene-styrene interpolymers, polyvinylchloride, polycarbonates and the like. These thermoplastic polymeric materials may be prepared with a relatively high degree of molecular orientation by methods well known in the art, such as, for example, by stretching thin sheets or films of the polymer and subsequently heat-treating so as to align the molecular strands parallel to the stretching direction.

The solid crystalline polymeric sulfur nitride employed in preparing the films in accordance with the present invention preferably should be analytically pure, free of $S_4N_4$ and $S_2N_2$. Such analytically pure crystalline polymeric sulfur nitride can suitably be synthesized by the method of Mikulski, et al, described above.

In carrying out the method of the present invention, the solid crystalline polymeric sulfur nitride starting material is heated to a temperature above its sublimation point to produce a vapor of the polymeric sulfur nitride, and the polymeric sulfur nitride vapor is thereafter condensed onto the surface of the highly-oriented thermoplastic polymeric substrate. This procedure is carried out in vacuo, for example, using a glass sublimator with a vacuum of $2 \times 10^{-5}$ torr or better, with the starting material being heated to a temperature within the range from about 140° C. to about 150° C. In order for high-quality film growth to occur, the surface of the substrate should be maintained at a temperature of not above 50° C., and preferably not above 25° C. for example, by attaching the substrate in good thermal contact to a 10–20° C. water-cooled finger. The distance between the surface of the solid polymeric sulfur nitride starting material and the surface of the substrate is preferably maintained at at least about 5 cm., since smaller separations generally result in films of reduced quality. This sublimation and condensation procedure is preferably carried out for a period from about 12 to about 18 hours, whereby epitaxial crystalline polymeric sulfur nitride film growth occurs on the substrate to a thickness within the range of from about 5,000 to 10,000 angstroms.

As shown by x-ray diffractometer studies, the epitaxial crystalline polymeric sulfur nitride films grown in the above manner consist of polymeric sulfur nitride identical in crystal structure to the starting materials, with no evidence of $S_4N_4$ or $S_2N_2$ present. The mean plane (102) of the polymeric sulfur nitride polymer chains lies in the plane of the film, with the chains being substantially completely aligned parallel to the direction of orientation of the substrate. These films exhibit over their entire surface a relatively high degree of anisotropy with respect to their electrical conductivity and optical properties, very similar to that exhibited by single crystals of polymeric sulfur nitride. When examined under polarized light, the color of such films over the substantial entirety of their surface appears golden under light polarized parallel to the polymer chains and dark blue-gray under perpendicularly polarized light, which is the same optical anisotropy exhibited by single crystals of polymeric sulfur nitride. Moreover, the electrical conductivity anisotropy, i.e., the ratio of the electrical conductivity measured parallel to the polymer chain axis to the electrical conductivity measured perpendicular to the polymer chain axis, is relatively large, generally ranging from about 10 to about 17 over a temperature range of from close to 0° K. to about room temperature.

As a specific example of the method and product obtained thereby in accordance with the present invention, a strip of ¼ ml. Mylar sheet was stretched and subsequently heat-treated to align the molecular strands parallel to the stretching direction. The Mylar substrate was further stroked several times parallel to the stretching direction with a slightly abrasive pad. Alignment of the substrate material was checked visually by examination between crossed polarizers. A completely oriented epitaxial crystalline polymeric sulfur nitride film was then fabricated on the Mylar substrate in the manner described above, by sublimation of an analytically pure solid crystalline polymeric sulfur nitride starting material synthesized by the method of Mikulski, et al, described above. A glass sublimator was employed with the polymeric sulfur nitride starting material being heated to a temperature of 150° C. in a vacuum of $2 \times 10^{-5}$ Torr or better. The Mylar substrate was attached to a water-cooled finger (10° – 20° C.), with the distance between the surface of the solid polymeric sulfur nitride starting material and the surface of the substrate being maintained at 15 cm.

The epitaxial crystalline polymeric sulfur nitride film was examined by x-ray diffraction and optical and electron microscopy. X-ray diffractometer measurements confirmed that the film consisted of polymeric sulfur nitride identical in crystal structure to the starting material, with no evidence of $S_4N_4$ or $S_2N_2$ present, and further that the mean plane (102) of the polymeric sulfur nitride polymer chains was in the plane of the film. Examination of the film under polarized light revealed a strong optical anisotropy. The film appeared golden under light polarized parallel to the polymer chain, and dark blue-gray under perpendicularly polarized light. Under high magnification (270 ×) it was observed that the entire film surface color changed with polarization simultaneously, with the exception of a few grains, of the order of a few microns across, which comprised less than 3 percent of the total film area.

The polarized optical reflectance, and the DC electrical conductivity of this epitaxial polymeric sulfur nitride film were measured parallel and perpendicular to the polymer chain axis within the (102) plane. Reflectance measurements were made in the infrared using a Perkin-Elmer Model 225 Spectrophotometer with a specular reflectant attachment. Visible and near-infrared measurements utilized a Cary 14 Spectrometer equipped with a Model 1413 specular reflectance attachment.

Figure 2:
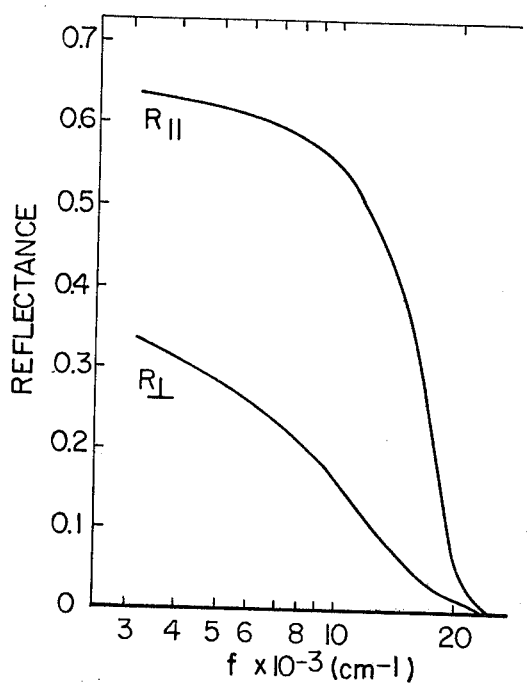
FIG. 2 is a graphical illustration of the polarized reflectance spectra of a polished single crystal of polymeric sulfur nitride.

The polarized reflectance spectra from 3,000 to 30,000 cm$^{-1}$ of this epitaxial polymeric sulfur nitride film on Mylar is shown in FIG. 1, with the symbol R ∥ denoting reflectance parallel to the polymer chain axis and the symbol R ⊥ denoting reflectance perpendicular to the polymer chain axis. The corresponding spectra of a carefully polished single crystal of polymeric sulfur nitride is shown for comparison purposes in FIG. 2. The qualitative agreement between the film and single crystal data can be seen by a comparison of these two Figures. With light polarized along the polymer chain direction, both the film and the crystal exhibit relatively high reflectance in the infrared and a plasma edge in the visible with a reflectance minimum near 22,000 cm$^{-1}$. The perpendicular reflectance of both samples is very small in the visible and increases to relatively large values in the infrared. The high optical anisotropy which is observed visually in both the epitaxial film and the crystal arises from the large values of the ratio R ∥ /R ⊥ in the visible (14,000 − 25,000 cm$^{-1}$). The parallel and perpendicular reflectance of the epitaxial film are lower at all frequencies than the corresponding reflectances of the crystal. As is frequently observed for thin films, this may be a result of a shorter electron scattering time. Light scattering from irregularities in the film surface cannot fully account for the differences at low frequencies, although this could be a contributing factor at visible frequencies. The reflectance of the epitaxial film shows very nearly the same anisotropy as that of the single crystal, indicating relatively complete alignment. The ratio R ∥ /R ⊥ in the visible exceeds 10:1 over a substantial frequency interval.

Figure 3:
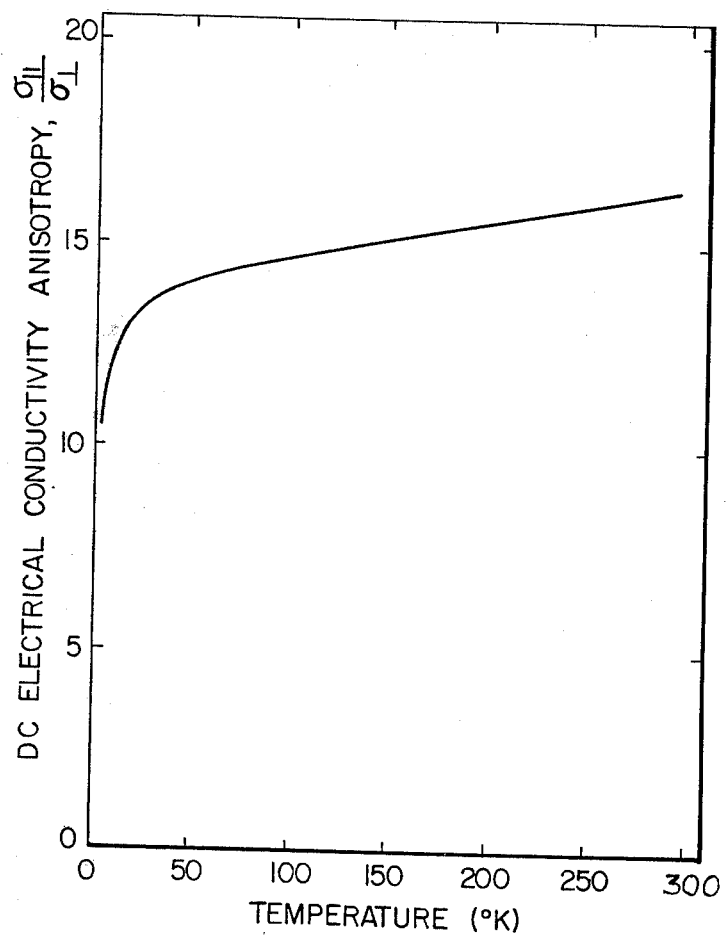
FIG. 3 is a graphical illustration of the temperature dependence of the DC electrical conductivity anisotropy of an oriented epitaxial crystalline polymeric sulfur nitride film prepared in accordance with the present invention.

The anisotropic DC electrical conductivity of the epitaxial polymeric sulfur nitride film on Mylar was measured using the method described by Montgomery, J. Appl. Phys., 42, 2971 (1971), over a temperature range of from close to 0° K. to about room temperature. The results are shown in FIG. 3, wherein the symbol σ ∥ denotes the DC electrical conductivity parallel to the polymer chain axis and the symbol σ ⊥ denotes the DC electrical conductivity perpendicular to the polymer chain axis. As can be seen from FIG. 3, the electrical conductivity anisotropy, σ ∥ /σ ⊥ , is relatively large over the entire temperature range, being close to 17 at room temperature and decreasing to about 10 at close to 0° K.

What we claim is:

1. A composite polymeric material having metallic surface properties comprising a highly-oriented thermoplastic polymeric substrate and an epitaxial crystalline film of polymeric sulfur nitride formed on the surface of said substrate, said polymeric sulfur nitride film being completely oriented parallel to the direction of orientation of said substrate and having a relatively high degree of anisotropy with respect to its electrical conductivity and optical properties.

2. The composite polymeric material of claim 1, wherein the optical anisotropy of said polymeric sulfur nitride film is such that the color of said film over the substantial entirety of its surface appears golden under light polarized parallel to said direction of orientation and dark blue-gray under light polarized perpendicular to said direction of orientation.

3. The composite polymeric material of claim 1, wherein the electrical conductivity anisotropy of said polymeric sulfur nitride film is within the range of from about 10 to about 17 over a temperature range of from close to 0° K. to about room temperature.

4. The composite polymeric material of claim 1, wherein said substrate is selected from the group consisting of polyolefins, fluorocarbon polymers and polyesters.

5. The composite polymeric material of claim 4, wherein said substrate is polyethylene.

6. The composite polymeric material of claim 4, wherein said substrate is polytetrafluoroethylene.

7. The composite polymeric material of claim 4, wherein said substrate is polyethylene terephthalate.

8. The composite polymeric material of claim 4, wherein said substrate is polyvinylidene fluoride.

9. The composite polymeric material of claim 1, wherein the thickness of said polymeric sulfur nitride film is within the range of about 5,000 to 10,000 angstroms.

10. A method of preparing a composite polymeric material having metallic surface properties comprising the steps of heating solid crystalline polymeric sulfur nitride to a temperature above its sublimation point to produce a vapor of said polymeric sulfur nitride, and thereafter condensing said polymeric sulfur nitride vapor onto the surface of a highly-oriented thermoplastic polymeric substrate to thereby form on said substrate an epitaxial crystalline polymeric sulfur nitride film completely oriented parallel to the direction of orientation of said substrate and having a relatively high degree of anisotropy with respect to its electrical conductivity and optical properties.

11. The method of claim 10, wherein the sublimation of said polymeric sulfur nitride is carried out in vacuo at a temperature within the range of from about 140° C. to about 150° C.

12. The method of claim 11, wherein the surface of said substrate is maintained at a temperature of not above 50° C.

13. The method of claim 12, wherein the sublimation and condensation procedure is carried out for a period of from about 12 to about 18 hours whereby said polymeric sulfur nitride film is grown to a thickness within the range of about 5,000 to 10,000 angstroms.

14. The method of claim 13, wherein the distance between the surface of the solid polymeric sulfur nitride being sublimed and the surface of said substrate is maintained at at least about 15 cm.

15. The method of claim 10, wherein said substrate is selected from the group consisting of polyolefins, fluorocarbon polymers and polyesters.

16. The method of claim 15, wherein said substrate is polyethylene.

17. The method of claim 15, wherein said substrate is polytetrafluoroethylene.

18. The method of claim 15, wherein said substrate is polyethylene terephthalate.

19. The method of claim 15, wherein said substrate is polyvinylidene fluoride.

* * * * *